United States Patent
Wagh et al.

(10) Patent No.: US 10,491,543 B1
(45) Date of Patent: *Nov. 26, 2019

(54) SHARED MEMORY SWITCH FABRIC SYSTEM AND METHOD

(71) Applicant: Juniper Networks, Inc., Sunnyvale (CA)

(72) Inventors: Rahul Wagh, Bangalore (IN); Kapil Suri, Bangalore (IN); Gurjeet Singh, Bangalore (IN); Harshad B Agashe, Pune (IN); Srihari Raju Vegesna, Bangalore (IN); Dinesh Jaiswal, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/990,420

(22) Filed: May 25, 2018

Related U.S. Application Data

(63) Continuation of application No. 14/871,706, filed on Sep. 30, 2015, now Pat. No. 9,985,912.

(51) Int. Cl.
*H04L 12/935* (2013.01)
*H04L 12/933* (2013.01)
*H04L 12/801* (2013.01)

(52) U.S. Cl.
CPC .............. *H04L 49/30* (2013.01); *H04L 47/18* (2013.01); *H04L 49/1569* (2013.01); *H04L 49/1576* (2013.01)

(58) Field of Classification Search
CPC ..... H04L 47/18; H04L 49/30; H04L 49/1569; H04L 49/1576
See application file for complete search history.

(56) References Cited

U.S. PATENT DOCUMENTS

| | | |
|---|---|---|
| 7,102,999 B1 | 9/2006 | Sindhu et al. |
| 7,466,703 B1 | 12/2008 | Arunachalam et al. |
| 8,284,771 B1 | 10/2012 | Julien et al. |
| 2008/0044181 A1 | 2/2008 | Sindhu |
| 2014/0153570 A1 | 6/2014 | Balakavi et al. |

(Continued)

OTHER PUBLICATIONS

U.S. Appl. No. 14/623,083, by Alam Yadav, filed Feb. 16, 2015.
Prosecution History for U.S. Appl. No. 14/871,706, filed Sep. 30, 2015.

*Primary Examiner* — Rhonda L Murphy
(74) *Attorney, Agent, or Firm* — Shumaker & Sieffert, P.A.

(57) ABSTRACT

A system and method of transferring cells through a switch fabric having a shared memory crossbar switch, a plurality of cell receive blocks and a plurality of cell transmit blocks. The system determines, based on a number of cells queued up in respective output buffers in the cell transmit blocks, output buffers in the cell transmit blocks that can receive cells on a low latency path. The cells transferred include first cells that can be transferred on the low latency path and second cells that cannot be transferred via the low latency path. The first cells are transferred via a bypass mechanism in shared memory to the output buffers. The second cells are transferred by writing the second cells to shared memory, reading the second cells from shared memory and transferring the second cells read from shared memory to the output buffers in the cell transmit blocks.

27 Claims, 9 Drawing Sheets

(56) References Cited

U.S. PATENT DOCUMENTS

| | | | |
|---|---|---|---|
| 2015/0188850 A1* | 7/2015 | Chan | G06F 15/167 709/238 |
| 2016/0065484 A1* | 3/2016 | Suzuki | H04L 47/522 370/415 |

* cited by examiner

SHARED MEMORY SWITCH FABRIC SYSTEM AND METHOD

This application is a continuation of U.S. patent application Ser. No. 14/871,706, filed Sep. 30, 2015, now U.S. Pat. No. 9,985,912, issued May 29, 2018, the entire contents of which is incorporated herein by reference.

TECHNICAL FIELD

The disclosure relates to computer networks and, more particularly, to transferring packets within computer networks.

BACKGROUND

A computer network is a collection of interconnected computing devices that can exchange data and share resources. In a packet-based network, such as an Ethernet network, the computing devices communicate data by dividing the data into variable-length blocks called packets, which are individually routed across the network from a source device to a destination device. The destination device extracts the data from the packets and assembles the data into its original form.

Certain devices, referred to as routers, maintain routing information representative of a topology of the network. The routers exchange routing information so as to maintain an accurate representation of available routes through the network. A "route" can generally be defined as a path between two locations on the network. Upon receiving an incoming data packet, a router examines information within the packet, often referred to as a "key," to select an appropriate next hop to which to forward the packet in accordance with the routing information.

A variety of routers exist within the Internet. Network Service Providers (NSPs), for example, maintain "edge routers" to provide Internet access and other services to the customers. Examples of services that the NSP may provide include Voice over IP (VoIP), access for Asynchronous Transfer Mode (ATM) or frame relay communications, Internet protocol (IP) data services, and multimedia services, such as video streaming. The edge routers of the NSPs often communicate network traffic to high-speed "core routers," which may be generally viewed as forming the backbone of the Internet. These core routers often include substantially more processing resources than the edge routers, and are designed to handle high volumes of network traffic.

In some examples, a core router includes one or more planes of switch fabric. In some such examples, each switch fabric includes a crossbar switch which connects two or more ingress ports to two or more egress ports. In some such examples, input queues received cells from the ingress ports and transfer the cells to output queues associated with each egress port. In some examples, a shared memory provides temporary cell storage when one or more output queues reaches capacity. In some such examples, when there is no congestion at the output queue the shared memory is bypassed via a crossbar switch.

In some examples, a core router or another router or switching device may employ a distributed, multi-stage switch fabric architecture, in which network packets traverse multiple stages of the switch fabric located in distributed forwarding components of the router to travel from an ingress point of the switch fabric to an egress point of the switch fabric. As one example, a switch fabric may be implemented as a single multi-stage Clos switch fabric, which relays communications across the stages of the switch fabric. A typical multi-stage Clos switch fabric has a plurality of switches interconnected to form a plurality of stages. In a typical arrangement, the switch fabric includes an ingress (or "first") stage, one or more intermediate stages, and an egress (or "final") stage, with each stage having one or more switches (e.g., crossbar switches—often referred to more simply as "crossbars"). Moreover, the switch fabric may be implemented such that the switches are arranged as multiple parallel fabric planes that each provide independent forwarding from ingress ports to egress ports through the multiple stages, one or more of which may be treated as a spare fabric plane. In other words, each of the parallel fabric planes may be viewed as an independent portion of the multi-stage Clos switch fabric, where each plane provides switching redundancy.

SUMMARY

In general, techniques are described for transferring cells through a switch fabric from an ingress port to output queues associated with egress ports. In one example, the switch fabric includes a shared memory and a low latency path that bypasses shared memory. In one such example, the shared memory provides temporary cell storage when one or more output queues reaches a predefined threshold.

In one example, a method of transferring cells through a switch fabric having a shared memory crossbar switch, a plurality of cell receive blocks and a plurality of cell transmit blocks includes determining, based on a number of cells queued up in respective output buffers in the cell transmit blocks, output buffers in the cell transmit blocks that can receive cells on a low latency path; and transferring cells from the cell receive blocks through the shared memory to the output buffers in the cell transmit blocks, wherein the cells include first cells that can be transferred on the low latency path and second cells that cannot be transferred via the low latency path, wherein transferring cells includes transferring the first cells via a bypass mechanism in shared memory to the output buffers and transferring the second cells by writing the second cells to shared memory, reading the second cells from shared memory and transferring the second cells read from shared memory to the output buffers in the cell transmit blocks.

In another example, a router includes a plurality N of cell transmit blocks, wherein each cell transmit block includes one or more output buffers; a plurality M of cell receive blocks, wherein each cell receive block includes one or more queues; a bank write crossbar switch connected to the cell receive block queues; a bank read crossbar switch connected to the output buffers in the cell transmit blocks; a shared memory connected to the bank write crossbar switch and to the bank read crossbar switch, wherein the shared memory includes a plurality of shared memory banks, wherein each shared memory bank includes a bypass mechanism used to transfer a cell received from one of the cell receive block queues via the bank write crossbar switch to one of the output buffers via the bank read crossbar switch; and a scheduler that routes cells received from the cell receive blocks to banks of the shared memory and that routes cells from the shared memory to the output buffers; wherein the scheduler determines if a cell in one of the cell receive block queues can bypass the shared memory and be routed via the bypass mechanism to one of the output buffers in one of the cell transmit blocks based on the number of cells queued up for that output buffer.

In another example, a router includes a plurality of ingress ports; a plurality of egress ports; a switch fabric having a plurality of fabric endpoints connected to the ingress ports and the egress ports, wherein the switch fabric includes one or more fabric planes, wherein each fabric plane includes one or more shared memory crossbar switches, wherein each shared memory crossbar switch includes a plurality N of cell transmit blocks, wherein each cell transmit block includes one or more output buffers; a plurality M of cell receive blocks, wherein each cell receive block includes one or more queues; a bank write crossbar switch connected to the cell receive block queues; a bank read crossbar switch connected to the output buffers in the cell transmit blocks; a shared memory connected to the bank write crossbar switch and to the bank read crossbar switch, wherein the shared memory includes a plurality of shared memory banks, wherein each shared memory bank includes a bypass mechanism used to transfer a cell received from one of the cell receive block queues via the bank write crossbar switch to one of the output buffers via the bank read crossbar switch; and a scheduler that routes cells received from the cell receive blocks to banks of the shared memory and that routes cells from the shared memory to the output buffers; wherein the scheduler determines if a cell in one of the cell receive block queues can bypass the shared memory and be routed via the bypass mechanism to one of the output buffers in one of the cell transmit blocks based on the number of cells queued up for that output buffer.

The details of one or more examples are set forth in the accompanying drawings and the description below. Other features, objects, and advantages will be apparent from the description and drawings, and from the claims.

BRIEF DESCRIPTION OF DRAWINGS

Like reference characters denote like elements throughout the figures and text.

DETAILED DESCRIPTION

Figure 1:
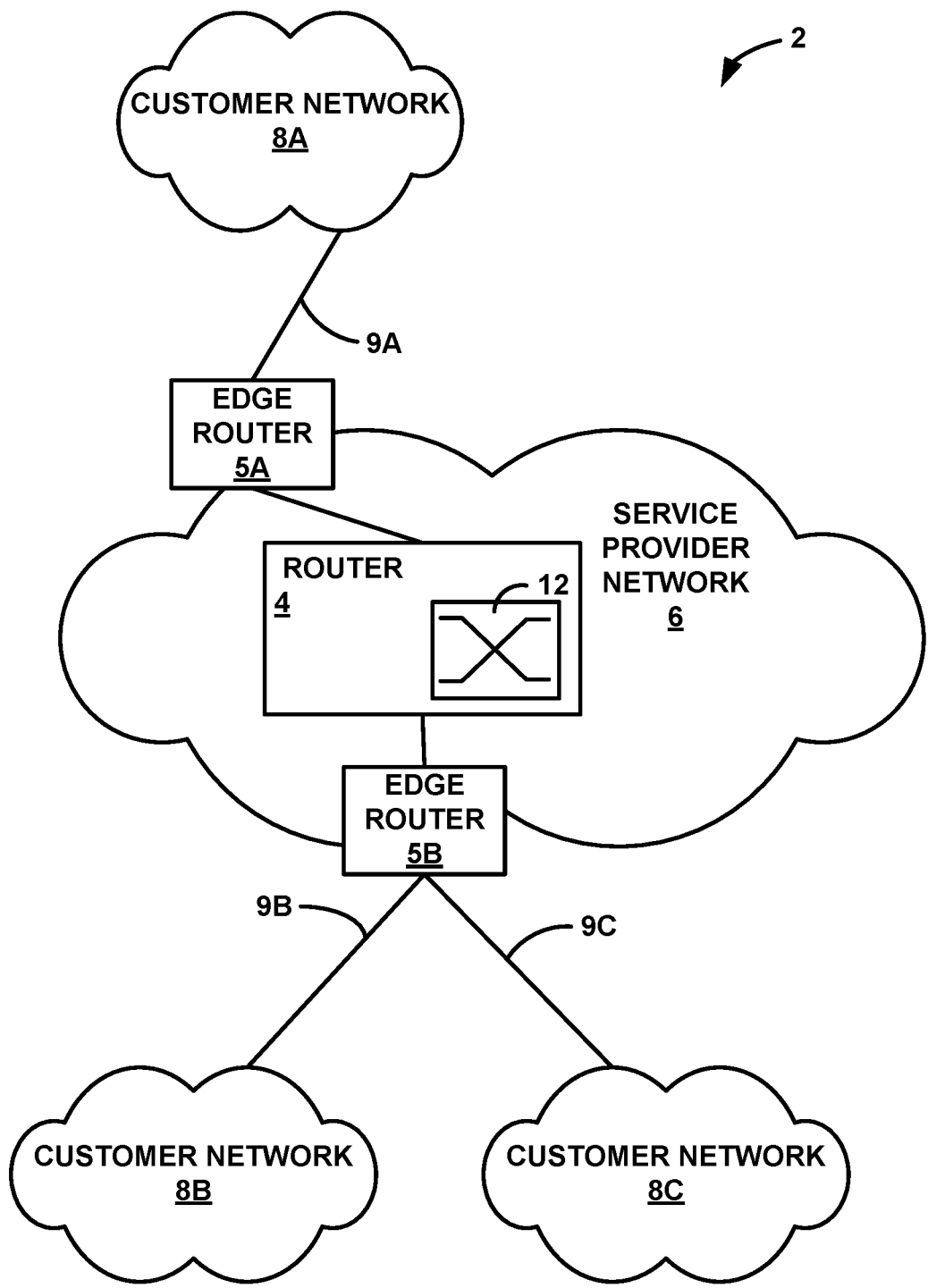
FIG. 1 is a block diagram illustrating an example network environment in which service provider network includes a router configured in accordance with techniques described in this disclosure.

FIG. 1 is a block diagram illustrating an example network environment in which service provider network includes a router 4 configured in accordance with techniques described in this disclosure. For purposes of example, the principles of the invention are described with respect to a simplified network environment 2 of FIG. 1 in which chassis router 4 communicates with edge routers 5A and 5B ("edge routers 5") to provide customer networks 8A-8C ("customer networks 8") with access to service provider network 6. Router 4 may exchange routing information with edge routers 5 in order to maintain an accurate representation of the topology of network environment 2. Router 4 may consist of a plurality of cooperative routing components operating as a single node within service provider network 6. In addition, while described with respect to router 4, the techniques disclosed herein are also applicable to single chassis routers and to other contexts in which a multi-stage switch fabric that switches data units is employed.

Although not illustrated, service provider network 6 may be coupled to one or more networks administered by other providers, and may thus form part of a large-scale public network infrastructure, e.g., the Internet. Consequently, customer networks 8 may be viewed as edge networks of the Internet. Service provider network 6 may provide computing devices within customer networks 8 with access to the Internet, and may allow the computing devices within customer networks 8 to communicate with each other. In another example, service provider network 6 may provide network services within the core of the Internet. In either case, service provider network 6 may include a variety of network devices (not shown) other than router 4 and edge routers 5, such as additional routers, switches, servers, or other devices.

In the illustrated example, edge router 5A is coupled to customer network 8A via access link 9A, and edge router 5B is coupled to customer networks 8B and 8C via access links 9B and 9C, respectively. Customer networks 8 may be networks for geographically separated sites of an enterprise. Customer networks 8 may include one or more computing devices (not shown), such as personal computers, laptop computers, handheld computers, workstations, servers, switches, printers, customer data centers or other devices. The configuration of network environment 2 illustrated in FIG. 1 is merely an example. Service provider network 6 may be coupled to any number of customer networks 8. Nonetheless, for ease of description, only customer networks 8A-8C are illustrated in FIG. 1. Many different types of networks besides service provider network may employ an instance of router 4, including customer/enterprise networks, transport networks, aggregation or access networks, and so forth.

In some examples, router 4 includes multiple chassis (not shown in FIG. 1) that are physically coupled and configured to operate as a single router. In some such examples, router 4 appears as a single routing device to edge routers 5 of network environment 2. For example, although router 4 includes a plurality of chassis, from the perspective of peer routers 5, router 4 has a single network address and maintains single peer routing sessions for each routing protocol maintaining peer routing sessions with each of the edge routers 5.

As described in further detail below, in some examples, the multiple routing nodes of router 4 forward packets, i.e., network traffic, on a data plane of router 4 using an internal multi-stage switch fabric 12 that interconnects fabric endpoints within the router to network interface cards (e.g., port interface cards) of the router. In the example of FIG. 1, the multi-stage switch fabric 12 switches data units from ingress ports of the network interface cards to the egress ports of the network interface cards to perform high-speed packet forwarding among and within the routing nodes of the router 4. Multi-stage switch fabric 12 may represent a 3-stage Clos network, a 5-stage Clos network, or an n-stage Clos network for any value of n. In general, packets received at an ingress port are divided into one or more fixed-length cells for switching. However, in some instances packets may be divided into variable-length data units for switching or switched intact as respective data units. A "data cell" or "cell" refers to a smallest block of data that is passed through the multi-stage switch fabric 12. The cell includes a header portion and a data portion. "Cell data" refers to data contained within a data portion of a cell. Additional details for example cell formats are described below with respect to FIG. 5. As used throughout this description unless specifically indicated otherwise, "cell" may refer to any data unit switched by a multi-stage switch fabric.

Figure 2:
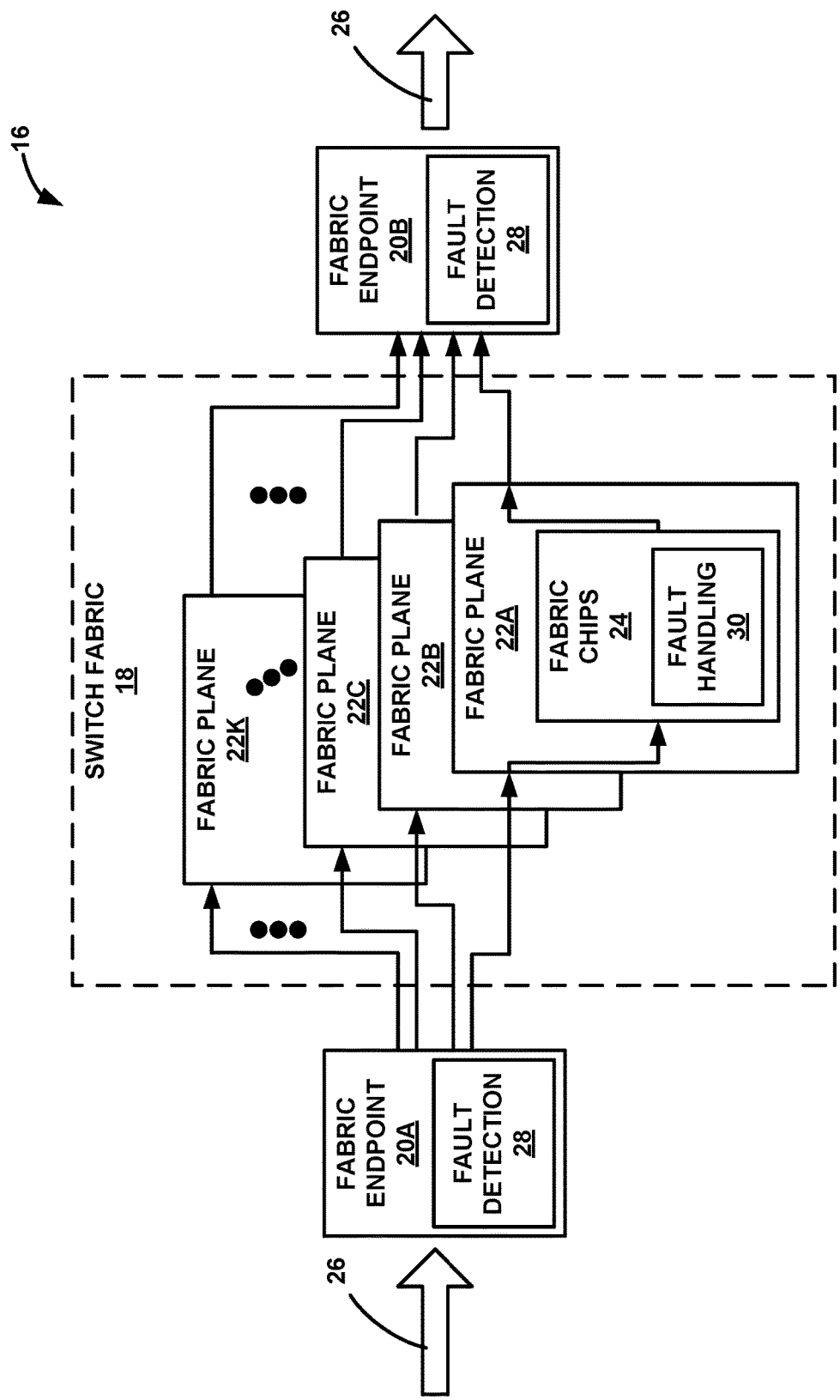
FIG. 2 is a block diagram illustrating an example of a switching system according to techniques described herein.

FIG. 2 is a block diagram illustrating an example of a switching system according to techniques described herein. Switch fabric 18 ("fabric 18") of switching system 16 may represent an example instance of switch fabric 12 of the router 4 of FIG. 1 or of fabric 250 of FIG. 3. In some examples, fabric endpoints 20A, 20B (collectively, "fabric endpoints 20") of switching system 16 are separately coupled to each of fabric planes 22A-22K of multi-stage switch fabric 18 to operate as sources and/or destinations of data units (e.g., cells) switched by fabric 18. In the illustrated example, fabric endpoint 20A ingresses, originates, or otherwise sources packets 26 for switching via switch fabric 18 to a fabric endpoint 20B that egresses, consumes, or otherwise sinks packets 26.

Although each of fabric endpoints 20 typically operates as both a source and a destination for cells, any of fabric endpoints 20 may be either a source or a destination for cells in various instances. In some examples, fabric endpoints 20 may each represent a packet forwarding engine or other forwarding unit such that fabric endpoints 20 collectively implement a distributed forwarding plane for a packet switching device (e.g. router 4). In some examples, fabric endpoints 20 may represent fabric interfaces for servers or other hosts (e.g., virtual machines) that exchange packets for a distributed application via fabric 18. Fabric endpoints 20 may include respective switch fabric interfaces or "switch interfaces" (SIs—not shown) to provide queuing for cells being switched via fabric 18, among other operations.

In this example, switch fabric 18 includes a plurality of operationally independent, parallel switch fabric planes 22A-22K (illustrated as "fabric planes 22A-22K") and referred to herein collectively as "fabric planes 22"). The number of fabric planes 22 may be any number, dependent upon the respective capacities of the fabric planes 22 and the fabric bandwidth needed. Fabric planes 22 may include 4, 5, or 18 planes, for instance. In some examples, fabric plane 22K operates as a backup or spare fabric plane to the remaining fabric planes 22. Each of fabric planes 22 includes similar components for implementing an independent Clos or other multi-stage switch network (e.g., Benes network) to provide independent switching bandwidth to fabric endpoints 20, said components and functionality being described hereinafter primarily with respect to fabric plane 22A. Fabric planes 22 are operationally independent in that a failure of one of fabric planes 22 does not affect the switching ability of the remaining, operational fabric planes. Each of fabric planes 22 may provide non-blocking connectivity. Additional details regarding an example of a multi-stage switch fabric having a plurality of switch planes are found in Pradeep S. Sindhu, U.S. Pat. No. 7,102,999, entitled "Switching Device" and filed Nov. 24, 1999, the description of which is incorporated herein by reference.

Each of fabric planes 22 includes an input port coupled to fabric endpoint 20A and an output port coupled to fabric endpoint 20B. Although only one ingress fabric endpoint 20A and one egress fabric endpoint 20B is illustrated for simplicity, each fabric plane 22 typically includes multiple input ports and output ports coupled to respective fabric endpoints. When a fabric endpoint 20A obtains a packet, the fabric endpoint 20A performs a lookup operation to determine which fabric endpoint 20B (in this example) is a destination for the packet. Obtaining a packet may refer to receiving a packet from the network or host, or originating a packet, for example. Fabric endpoint 20A optionally divides the packet into cells and forwards the packet/cells across fabric 18 to fabric endpoint 20B. Fabric endpoint 20A selects different fabric planes 22 to switch the cells to distribute the bandwidth load across the fabric planes 22.

Fabric endpoints 20A, 20B may employ a request/grant protocol to transmit a data cell across fabric 18. In such cases, source fabric endpoint 20A transmits a request across fabric 18 to the destination fabric endpoint 20B. Fabric endpoint 20A transmits each such request across a different one of fabric planes 22 in a round-robin or other balancing order to fairly distribute the transport load. In response to receiving the request, fabric endpoint 20B transmits a grant to the fabric endpoint 20A across the same fabric plane 22 on which fabric endpoint 20B received the corresponding request. In response to receiving the grant, fabric endpoint 20A transmits the data cell to the fabric endpoint 20B across the same fabric plane 22 on which fabric endpoint 20A issued the corresponding request.

As noted above, each of fabric planes 22 may include similar components to perform similar multi-stage switch functionality. Fabric plane 22A, as an example, includes a plurality of fabric chips 24 coupled by fabric chip-to-chip links (CCLs—not shown) to implement a multi-stage switch fabric for the fabric plane 22A. Fabric chips 24 may be distributed among various switching devices, chassis, etc., of the switching system 16. Each of fabric chips 24 may include an application-specific integrated circuit (ASIC) and may be referred to as a "fabric ASIC."

In some examples, fabric endpoint 20A includes fault detection module 28 to generate and receive self-ping cells to verify per-plane connectivity for the fabric endpoint 20A with respect fabric planes 22. Fabric chips 24A include a fault handling module 30, which may include logic distributed among the various fabric chips 24. Fault detection module 28, upon determining a connectivity fault with fabric plane 22A, e.g., sends an indication of the connectivity fault to the fabric plane 22A. This indication may be a cell specially-generated by fault detection module 28. In addition, fabric endpoint 20A may at least temporarily modify its operation to avoid transmitting cells to other fabric endpoints 20 on the fabric plane 22A.

On receiving the indication of a connectivity fault via an input port to fabric plane 22A, fault handling module 30 distributes the indication among the fabric chips 24, which send indications of the connectivity fault to other fabric endpoints 20 via output ports of the fabric plane 24. In this way, fault detection module 28 of fabric endpoint 20A and fault handling module 30 of fabric plane 22A may cooperatively identify and distribute, in the data path and in a distributed manner, indications of a connectivity fault for fabric endpoint 20A with respect to fabric plane 22A. In response to receiving an indication of the connectivity fault, other fabric endpoints 20 may avoid using fabric plane 22A to transmit cells to fabric endpoint 20A.

Fault detection module 28 may determine the connectivity fault by determining that a self-ping cell sent was not received within an expected time. In some instances, fault detection module 28 may only declare a connectivity fault after a number of consecutive such failures to receive a self-ping cell previously sent by fault detection module 28. Fault detection module 28 may generate and send self-ping cells to fabric planes 22A according to a defined period. Fault detection module 28 may generate and send self-ping cells on a per-plane basis, i.e., fault detection module 28 may perform the operations described above with respect to each of fabric planes 22 in order to verify connectivity with all fabric planes 22. Example approaches to failure detection and handling in a router and switch fabric are described in "Multi-Stage Switch Fabric Fault Detection and Handling," U.S. patent Ser. No. 14/623,083, filed Feb. 16, 2015, the description of which is incorporated herein by reference.

While described for purposes of illustration with respect to a router having distributed line-card chassis, each coupled to one or more switch card chassis, the techniques of this disclosure are applicable to any single or multi-chassis network device or network switching fabric that switches data units among a large number of fabric endpoints.

Figure 3:
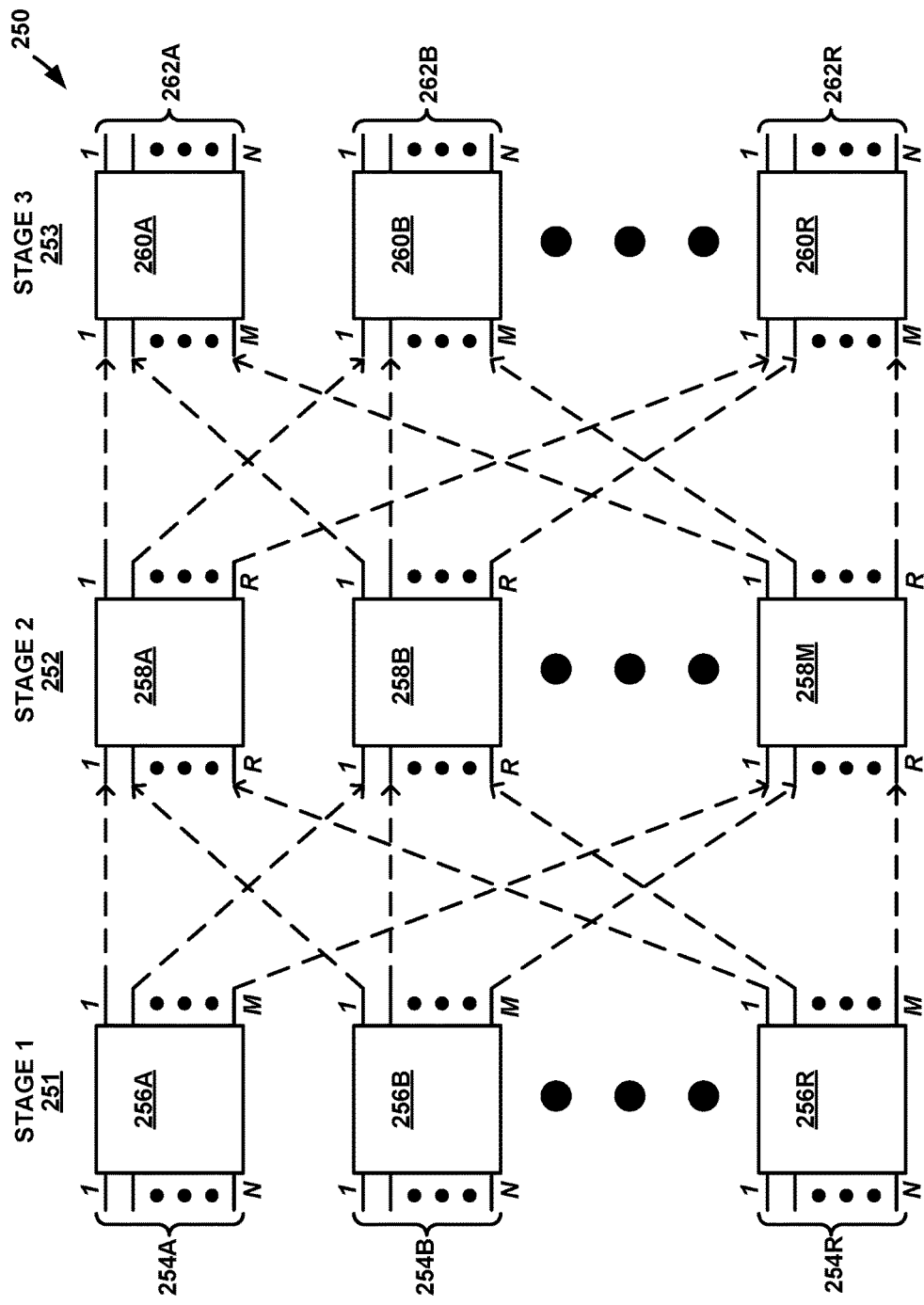
FIG. 3 is a block diagram illustrating a logical representation of a three-stage switching network that operates in accordance with techniques described herein.

FIG. 3 is a block diagram illustrating a logical representation of a three-stage switching network 250 (or "switch fabric 250") that operates in accordance with techniques described herein. Three-stage network 250 may logically represent switch fabric 12 of FIG. 1, switch fabric 18 of FIG. 2, or any other switch fabric in which components or devices are interconnected to provide a multi-stage switch fabric. The three stages of the example network 250 of FIG. 3 include: stage 1 251 consisting of crossbar switches 256A-256R (collectively "switches 256"), stage 2 252 consisting of crossbar switches 258A-258M (collectively "switches 258"), and stage 3 253 consisting of crossbar switches 260A-260R (collectively "switches 260"). In the example shown, each switch 256 receives data packets via N inputs 254 (collectively "inputs 254"); there are a total of N×R inputs 254 in this example. Switches 260 send the data packets via N output ports 262 (collectively "outputs 262"); there are a total of N×R outputs 262 in this example.

As shown in FIG. 3, stage 1 251 and stage 3 253 each include R crossbar switches, while stage 2 252 includes M crossbar switches. In the example shown, three-stage network 250 is coupled to N inputs and N outputs, thus completing the characterization of the Clos network. The integer values for M and N define blocking characteristics of three-stage switching network 250. For example, stage 2 252 may include more crossbar switches than stage 1 251 and stage 3 253 (i.e., M>R) to reduce or eliminate the possibility that an open one of inputs 254 could be blocked from an open one of outputs 262.

Each of switches 256, 258, 260 may be implemented by a fabric chip 24. In some cases, corresponding stage 1 switches 256 and stage 3 switches 260 (e.g., switch 256A and switch 260A) may be implemented by a same fabric chip 24. As described with respect to router 150 of FIG. 3, stage 1 251 and stage 3 253 may be located in a plurality of LCCs, while stage 2 252 is located in an SCC.

To establish a path through network 250 from one of inputs 254 to the intended output 262, the one of switches 256 associated with the receiving input 254 determines an available stage 2 252 switch 258 that allows a connection path to the stage 3 253 switch 260 including the intended output 262. For example, assume a packet received by switch 256A is to be relayed to one of outputs 262A on switch 260A. Switch 256A selects any of switches 258 with an open connection to both switch 256A and switch 260A. Assume switch 256A selects switch 258B. Once switch 258B receives the data packet, switch 258B determines an available path to switch 260A and forwards the data packet to switch 260A. For example, switch 258B may have more than one open path to switch 260A.

In accordance with techniques described herein, each of switches 256, 258, 260 may include an instance of fault handling module 30 for determining and distributing indications of fabric connectivity and link faults to fabric endpoints 20 coupled to the network 250.

While generally described as a three-stage switch network such as network 250, in other examples fabric planes described herein may contain different switch architecture. For example, the second stage in a three-stage network may be replaced with another three-stage network, thereby forming a five-stage network. Additional details regarding an example of a router having a multi-stage switch fabric are found in Pradeep S. Sindhu, U.S. Patent Publ. No. 2008/0044181 A1, entitled "Multi-chassis router with multiplexed optical interconnects" and published Feb. 21, 2008, the descriptions of which are incorporated herein by reference. Other switch fabric architectures are also possible.

Figure 4:
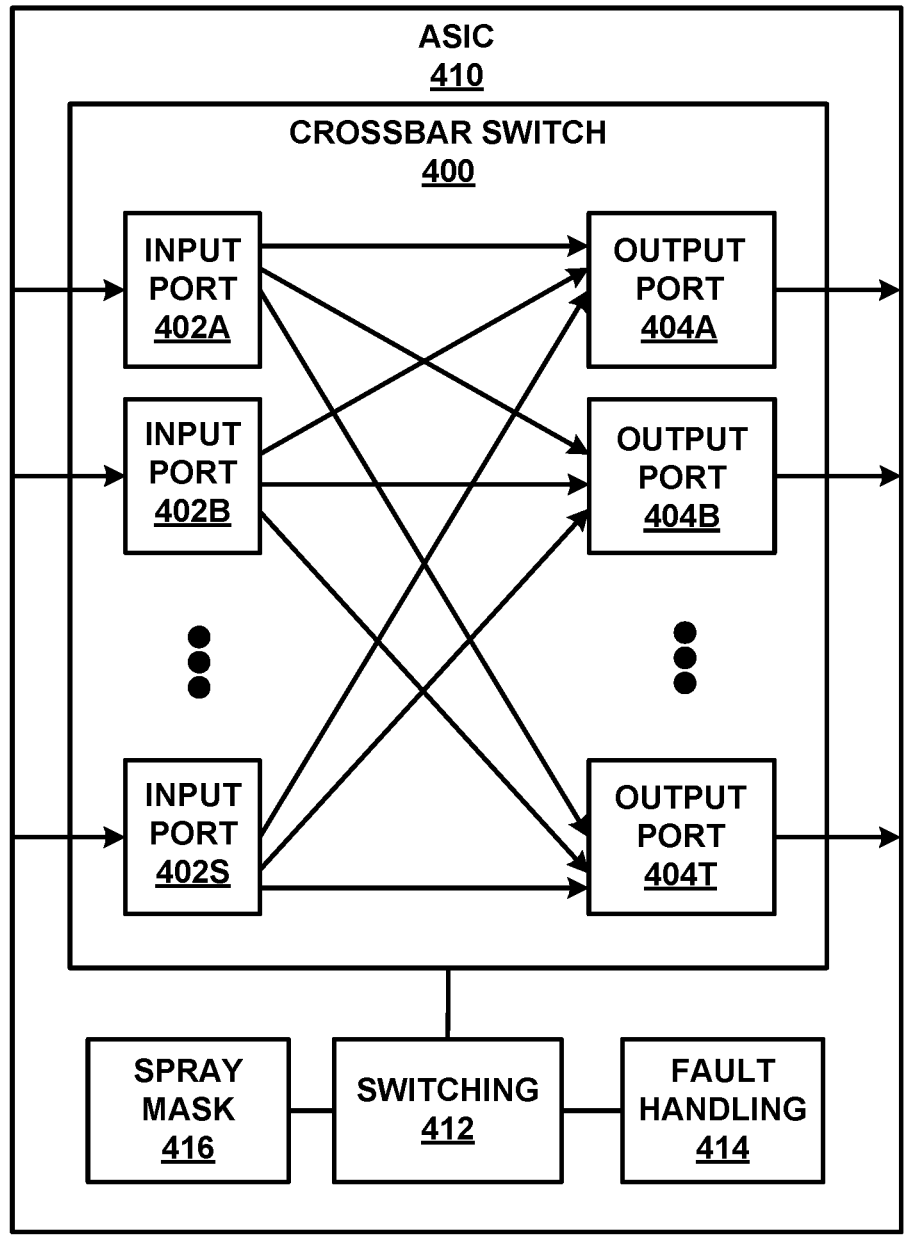
FIG. 4 is a block diagram depicting an application-specific integrated circuit (ASIC) configured to implement a stage switch and perform fault detection and distribution of fault indications in accordance with techniques described in this disclosure.

FIG. 4 is a block diagram depicting an application-specific integrated circuit (ASIC) configured to implement a switch in accordance with techniques described in this disclosure. ASIC 410 represents hardware-based logic and may include a programmable integrated circuit. ASIC 410 may represent an example of a fabric chip 24 and, in some examples, implements crossbar switch 400 for a stage of a multi-stage switching fabric. Crossbar switch 400 may represent any of switches 256, 258, and 260, for instance.

Crossbar switch 400 has input ports 402A-402S (collectively, "input ports 402") each capable of spraying cells via a full mesh to each of output ports 404A-404T (collectively, "output ports 404"). Switching module 412 is programmed with spray mask 416 that identifies output ports 404 usable for reaching destination fabric endpoints 20. Fault handling module 414 may be configured to detect link faults and to handle fault notification cells and generate and send fault notification cells/messages. Although individual crossbars are described herein, respectively, as components in the first, second, and third stages of multi-stage switching fabrics, a single generic type of crossbar switch may be used for all three stages by configuring the operational mode of the ASIC 410 accordingly.

Figure 5:
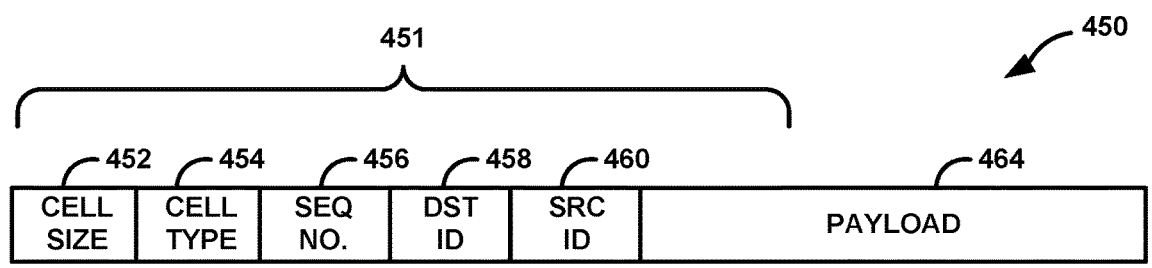
FIG. 5 is a block diagram illustrating an example data cell format according to techniques of this disclosure.

FIG. 5 is a block diagram illustrating an example data cell format according to techniques of this disclosure. Different cell types according to data cell 450 define operations for fabric endpoints 20 and different stage switches in a multi-stage switch fabric, as described in further detail below. Data cell 450 includes a cell header 451 and cell payload 464. Cell header 451 includes the following fields: cell size 452, cell type 454, sequence number (SEQ NO.) 456, destination identifier (DST ID) 458, and source identifier 460 (SRC ID). Various example implementations for cell header 451 may rearrange fields, include more or fewer fields, and so forth.

Cell size 452 specifies the size of the cell payload 464 or, in some cases, the size of data cell 450 including both the cell header 451 and the cell payload 464. An example header size is 24 bytes. Example cell sizes include 96, 112, 128, 144, 160 and 176 bytes. Cell type 454 identifies the type of the cell, including the type of fabric chip (e.g., a first stage, intermediate/second stage, third/final stage, or fabric endpoint) that is to consume and process the cell. Sequence number 456 identifies a sequence number for the cell. Cell destination identifier 458 and cell source identifier 458 identify the destination fabric endpoint and source fabric endpoint for the cell, respectively. The data payload 464 for data cell 450 is typically packet data for packets switched by the switching system, whether a packet switch or data center fabric for instance. Payload 464 may, however, be used in some instances to transfer other information such as, for example, indications of connectivity faults or fabric faults in a fabric plane of the switching system.

Figure 6:
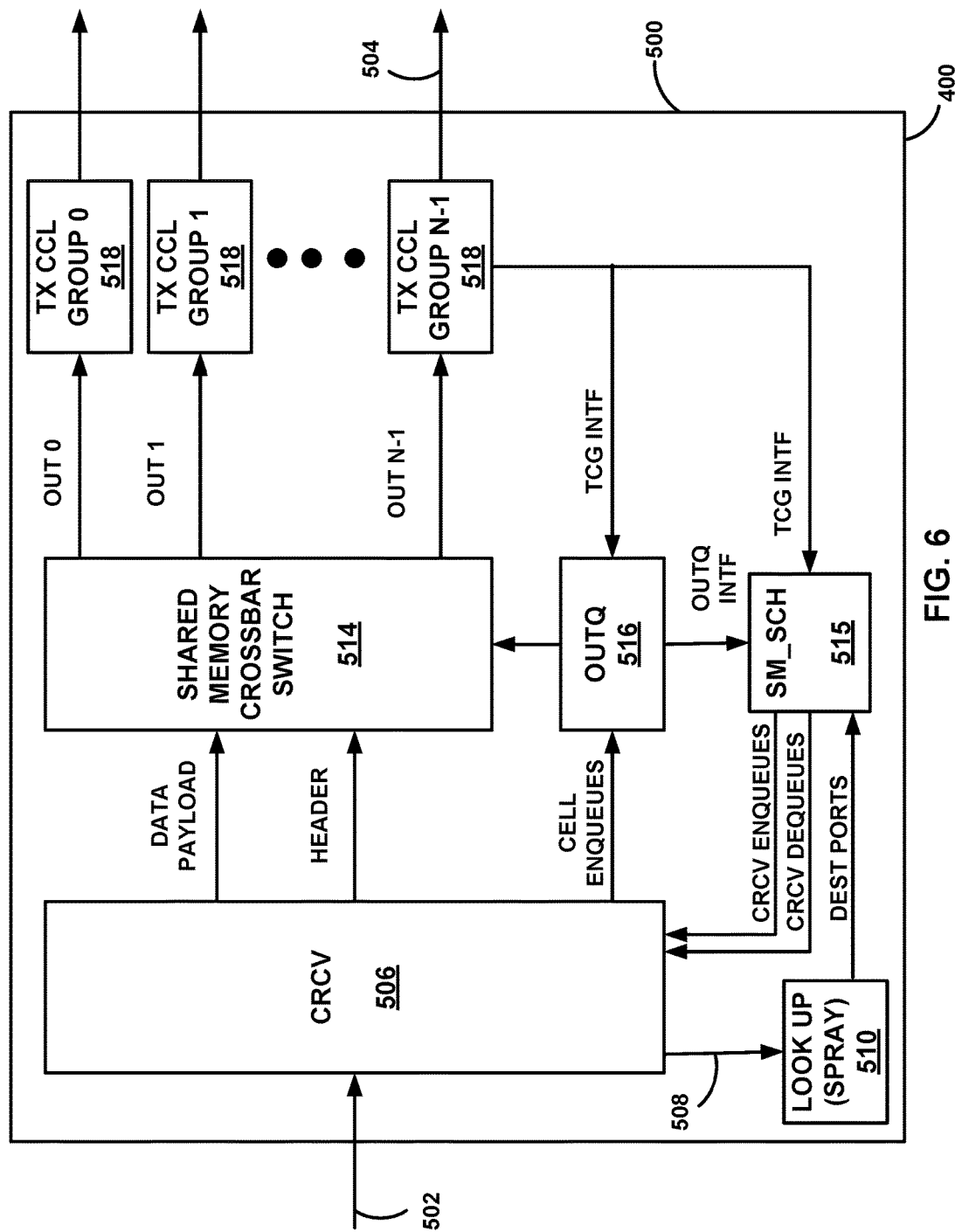
FIG. 6 is a block diagram illustrating an example shared memory crossbar switch according to techniques of this disclosure.

FIG. 6 is a block diagram illustrating an example of crossbar switch 400. Any-to-any crossbar switches create congestion in the switching fabric. If the data-bus is 176 bytes and crossbar switch 400 has to switch 12 cells a cycle, crossbar switch 400 requires a crossbar of 12×176 bytes. The approach shown in FIG. 6 uses the shared memory crossbar 514 to do the transfer from input interface 502 to output interface 504 and, as the output queue depth of an output queue in a cell transmit block (such as Transmit CCL group 518) increases (which is caused due to congestion), then the switching is dynamically moved to shared memory within shared memory crossbar switch 514. Then, as the output queue depth of an output queue in a Transmit CCL group 518 decreases, the switching is moved out of shared memory again. Since only one crossbar is used, this approach is very efficient.

In the example shown in FIG. 6, crossbar switch core 500 is connected to input ports 402 via input interfaces 502 and to output ports 404 via output interfaces 504. In one example approach, CCL ports groups send cells to Cell Receive (CRCV) block 506 via input interfaces 502. In some example approaches, cell writes and cell reads happen in interleaved fashion. Data read from the shared memory of shared memory crossbar 514 is sent a block at a time to a Transmit CCL Group (TCG) 518. Each TCG 518 then sends the data to a CCL port group via a corresponding output interface 504.

In one example approach, spray lookup module 510 receives source and destination information via spray port 508, uses mapping tables to do a destination-based look up and sends an output port number to sm_sch module 515. In some such examples, spray lookup module 510 also has another table which indicates whether the cell can be transferred via a low latency path, which, in some such examples, is indicated as a low latency enable signal also sent to sm_sch module 515. In other example approaches, sm_sch module 515 receives the output port numbers from spray module 510 and determines if any of the cells are low latency path capable. CRCV block 506 then queues the cell appropriately and sends the cell to the bank of shared memory in shared memory crossbar switch 514 appropriate for the destination. In one example, there is a separate 16 byte interface for every physical bank inside the logic bank of shared memory. CRCV block 506 also sends the enqueue of the cell to OUTQ 516 so that it can be added to an appropriate bank queue.

Because of shared space utilization among all output ports 404, and unknown arrival time of cells at input ports 402, there can be conflict while admitting cells in shared memory crossbar switch 514. In the example shown in FIG. 6, a shared memory scheduler (sm_sch) module 515 performs the admission decision based on available resources and the shared space arbitration for the cells. Also, to support a low latency path, this module supports arbitration for low latency enabled paths based on dynamic accounting. During this time frame these cells are temporarily stored in crcv sub-blocks within crcv block 506. In one example approach, the control functionality and arbitration which is global across all cell groups are performed by sm_sch module 515.

In one example approach, spray module 510 sends each cell's input and output port information to sm_sch module 515 with an associated tag (a total of 12 instances in this example). After admitting the cell based on available resources and the bank spraying operation, sm_sch module 515 sends out the decision to each crcv block 506 with the received tag, and enables the corresponding queue for arbitration. In one example approach, sm_sch module 515 maintains separate low latency path queues and shared memory write queues. In one such example approach, sm_sch module 515 indicates the low latency path has been selected with a low latency bit sent to the appropriate CRCV block 506. In one example approach, crcv block 506 includes a low latency path queue for each output buffer in TCGs 518 and a shared memory write queue for each bank of shared memory. In some example approaches, each TCG 518 includes an output buffer for each of two or more sub-channels and crcv block 506 includes a low latency path queue for each sTCG 518.

In one example approach, shared memory crossbar switch 514 writes the data to the appropriate bank of shared memory using a write crossbar switch. In one such example approach, if the low latency path is enabled for that bank, then the write is immediately followed by a read using the write address. In another such example approach, if the low latency path is enabled for that bank, then shared memory is bypassed, with the cell directed instead to the output connected to the destination TCG 514.

In one example, OUTQ 516 sends a dequeue request for a bank read for each cell using a time-division multiplex (TDM) table. The slot assigned to CCL cell group is decided by the TDM table. In one example, once a CCL cell group gets access to a bank, one of the ports 404 within the CCL cell group gets access to the bank.

In one example approach, shared memory 514 reads the data either using the bypassed address from the low latency path or the read address from OUTQ 516. In one such approach, the data is sent to the appropriate CCL cell group (TCG) 518 interface using a read crossbar switch. In one such example, each TCG block 518 interfaces with the CCL port group block to send 64 bit data per SerDes.

Figure 7:
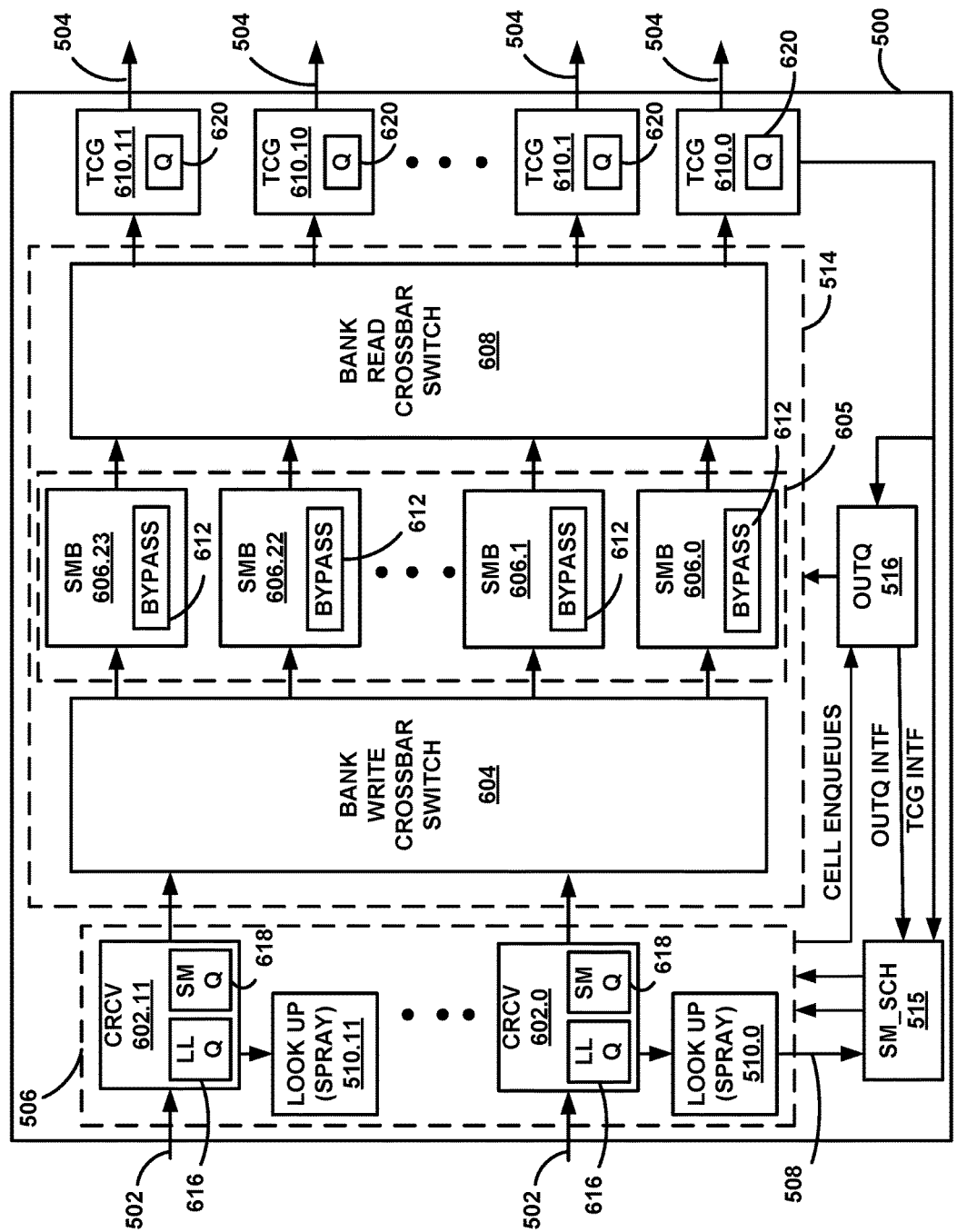
FIG. 7 is a block diagram illustrating another example shared memory crossbar switch according to techniques of this disclosure.

FIG. 7 is a block diagram illustrating a more detailed example of a crossbar switch core 500 having a shared memory crossbar switch 514 as illustrated in FIG. 6. The approach shown in FIG. 7 uses the shared memory crossbar switch 514 to do the transfer from input interface 502 to output interface 504. As the output queue depth of an output queue 620 in TCG 610 increases (which is caused due to congestion), then the switching corresponding to that output queue is dynamically moved to shared memory 605 within shared memory crossbar switch 514. Then, as the output queue depth of output queue 620 in TCG 610 decreases, the switching corresponding to that output queue is moved out of shared memory 606 again. During all transfers (input-to-output switching and shared memory switching) only the crossbar switches to and from shared memory are used, which makes this design very efficient. A fabric 18 implemented with the shared memory crossbar switch 514 described above can be used as well in switching or repeater mode. In repeater mode, when it needs any to any flexibility, then the shared memory crossbar switch 514 described above provides better behavior with predictable latency.

In the example shown in FIG. 7, shared memory crossbar switch 514 includes a bank write crossbar switch 604, a bank read crossbar switch 608 and a shared memory 605 arranged as 24 shared memory banks labeled 606.0 through 606.23. Each shared memory bank 606 includes a bypass mechanism 612 used to transfer cells on a low latency path through shared memory 605.

The shared memory needed to support M cells/cycle enqueue and M cells per cycle dequeue requires M dual ported memory banks, or 2M single ported memory banks. In the example shown in FIG. 7, each memory bank 606 is a single ported memory bank, requiring 12+12 or 24 memory banks 606. Each memory bank 606 implements output-based queues using a link-list data structure, and traffic for an output port 404 is sprayed in a round-robin fashion across the memory banks 606.

In the example shown in FIG. 7, crossbar switch core 500 is connected to input ports 402 via input interfaces 502 and to output ports 404 via output interfaces 504. In one example approach, each CCL ports group sends cells to a corresponding Cell Receive (CRCV) block 602 via input interfaces 502. In some such example approaches, such as is shown in FIG. 7, each CCL port group includes N input ports 402 and N output ports 404; each CRCV block 602 receives cell data from each of the N input ports 402 of its corresponding CCL port group on a corresponding input interface 502 and queues it up as necessary before forwarding the cells to banks 606 within shared memory crossbar switch 514. In the one example approach, N=4. In one example approach, each CRCV block 602 queues cell data from its CCL port group in an internal CRCV conflict resolution FIFO (ICRF) (not shown).

In one example approach, as shown in FIG. 7, spray lookup module 510 is distributed across each CRCV block 602, with a spray lookup module 510 assigned to each CRCV block 602. The output of each spray lookup module 510 is fed, in some such example approaches, to a shared sm_sch module 515. Shared sm_sch module receives port information from each spray lookup module 510 and delivers enqueue and dequeue signals to the individual CRCV blocks 602. In some example approaches, sm_sch module 515 enables flow control in each CRCV block 602 and enqueuing and dequeuing of queues in the CRCV blocks 602.

In some example approaches, each crcv block 602 receives cells in multiple cycles. The spry operation is started when the cell head is received (in order to reduce the latency of full cell accumulation). To support and maintain this latency, in some example approaches, cell writes and cell reads from shared memory 605 happen in interleaved fashion. Data read from the shared memory 605 of shared memory crossbar 514, for instance, is sent a block at a time to a Transmit CCL Group (TCG) 514. Each TCG 514 then sends the data to a CCL port group via a corresponding output interface 504.

In one example approach, the cells for a given stream (sub-channel) are sprayed across all the banks 606 so that the reads will not have any conflicts. For a given output buffer 620 it gets access to one bank/cycle for transfer of read data, this is a static partition of the bank bandwidth to an output buffer. In one such approach, this static partitioning of bank bandwidth to output buffers is achieved using round robin (or a TDM table). When low latency traffic needs to be sent to an output buffer from any of the input buffers then in some approaches the existing shared memory crossbar may be overloaded to achieve this switching.

In one example approach, sm_sch module 515 maintains a queue per bank 606 and a queue per output buffer 620. In one such approach, TCG 518 maintains some buffers per sub-channel as storage for cells, if the shared memory is empty for that sub-channel and the number of entries in the output buffer for that sub-channel is below a threshold than the low latency transfer is enabled. Once the number of entries in the output buffer is over the threshold low latency transfers for that sub-channel are disabled and the transfers happen through shared memory. The transfers can again move out of shared memory once the shared memory queue for that sub-channel is empty and the number of entries in the output buffer is below a threshold. A queue can move dynamically from low latency to shared memory and back to low latency depending on the traffic pattern.

In one example approach, as noted above in the example of FIG. 6, spray lookup module 510 receives source and destination information, uses mapping tables to do a destination-based look up and sends an output port number to sm_sch module 515. In some such examples, sm_sch module 515 also has a table which indicates whether the cell can be transferred via a low latency path, which, in some such examples, is indicated as a low latency enable signal sent to the appropriate CRCV block 602. That CRCV block 602 then queues the cell appropriately and sends the cell to a selected bank 606 of shared memory in shared memory crossbar switch 514. In one example, there is a separate 16 byte interface for every physical bank inside the logic bank of shared memory. Each CRCV block 602 also sends the enqueue of cells transferred to OUTQ 516 so that it can be added to the appropriate bank queue. In one example approach, OUTQ 516 maintains a queue for every bank 606. Each cycle one CCL cell group gets access to a given bank (in a TDM fashion). The same information may be used to assign a bank number for low latency cell transfer. This guarantees that the write to read bypass can happen in shared memory without penalizing the other CCL cell groups.

In one example approach, shared memory 514 writes the data to the appropriate bank 606 of shared memory 605 using write crossbar switch 604. In one such example approach, if the low latency path is enabled for a bank 606, bypass mechanism 612 operating in conjunction with OUTQ 516 ensures that a write to that bank 606 is followed by a read using the write address. In another such example approach, if the low latency path is enabled for a bank 606, then shared memory is bypassed via bypass mechanism 612, with the cell received at the bank 606 directed instead to the output of the bank. In one example approach, if low latency is enabled for a bank 606 then the write address is bypassed and uses as read address.

In one example, OUTQ 516 sends a dequeue request for a bank read for each cell using a time-division multiplex (TDM) table. The slot assigned to the CCL cell group is decided by the TDM table. In one example, once a CCL cell group gets access to a bank 606, one of the ports 404 within the CCL cell group gets access to the bank.

In one example approach, shared memory 514 reads the data either using the bypassed address from the low latency path or the read address from OUTQ 516. In one such approach, the data is sent to the appropriate CCL cell group (TCG) 518 interface using read crossbar switch 608. In one such example, each TCG block 518 interfaces with the CCL port group block to send 64-b data per SerDes link.

As noted above, because of shared space utilization among all output ports 404, and unknown arrival time of cells at input ports 402, there can be conflict while admitting cells in shared memory crossbar switch 514. In the example shown in FIG. 7, a shared memory scheduler (sm_sch) module 515 performs the admission decision based on available resources and the shared space arbitration for the cells. Also, to support a low latency path, this module supports arbitration for low latency enabled paths based on dynamic accounting. During this time frame these cells are temporarily stored in crcv blocks 602. In one example approach, the control functionality and arbitration which is global across all cell groups are performed by sm_sch module 515.

In one example approach, sm_sch module 515 receives each cell's input and output port information from spray module 510 with an associated tag (a total of 12 instances in this example). After admitting the cell based on available resources and bank spraying operation, sm_sch module 515 sends out the decision to each crcv block 602 with the received tag, and enables the corresponding queue for arbitration. In one example approach, sm_sch module 515 maintains a low latency path queue 616 and a shared memory write queue 618 in each CRCV block 602 and maintains an output queue 620 in each TCG 610.

In one example approach, sm_sch module 515 maintains separate low latency path queues and shared memory write queues. In one such example approach, each crcv block 602 includes a low latency path queue 616 for each output buffer 620 in TCGs 518 and a shared memory write queue 618 for each bank 606 of shared memory 605. In some example approaches, each crcv block 602 includes a cell group of two or more channels; each TCG 518 includes an output buffer 620 for each of two or more sub-channels and each crcv block 602 includes a low latency path queue 616 for each cell group for each sub-channel output buffer 620.

In one example approach, the scheduler at the input in sm_sch module 515 does the following to get the maximal matching for transfers from input to shared memory in the following priority order: first, it does the maximal matching to choose the low latency transfers from input-output buffers. If a match happens then it assigns the bank through which the transfer is going to happen (in some example approaches, this may be done using a TDM table). Second, all the input buffers and banks that are used for low latency transfers are disabled for shared memory writes. The scheduler then does the maximal matching for the input buffers to shared memory banks. In one example approach, this maximal matching happens independent of the low latency matching, but the outputs selected for low latency transfers do not progress in the connection. That is, the connection is accepted and retained but won't progress until a later cycle. Finally, the scheduler does work conserving arbitration to assign any of the remaining input buffers to shared memory banks.

On an arbitration win, sm_sch module 515 sends the cell de-queuing (en-queue in sm) information to each crcv block 602 with pre-fetches per bank 606 sm pointer from the outq module 516. To manage cell admission decision, sm_sch module 515 interfaces with tcg 610 and outq module 516 to get the number of credits (i.e. available space and free sm pointers, respectively). In one example approach, sm_sch module 515 also provides shared memory enqueuing information to each CRCV block 602, which, in some example approaches, is passed from CRCV block 602 to OUTQ module 516 when actually transferring a cell to shared memory 605.

Figure 8:
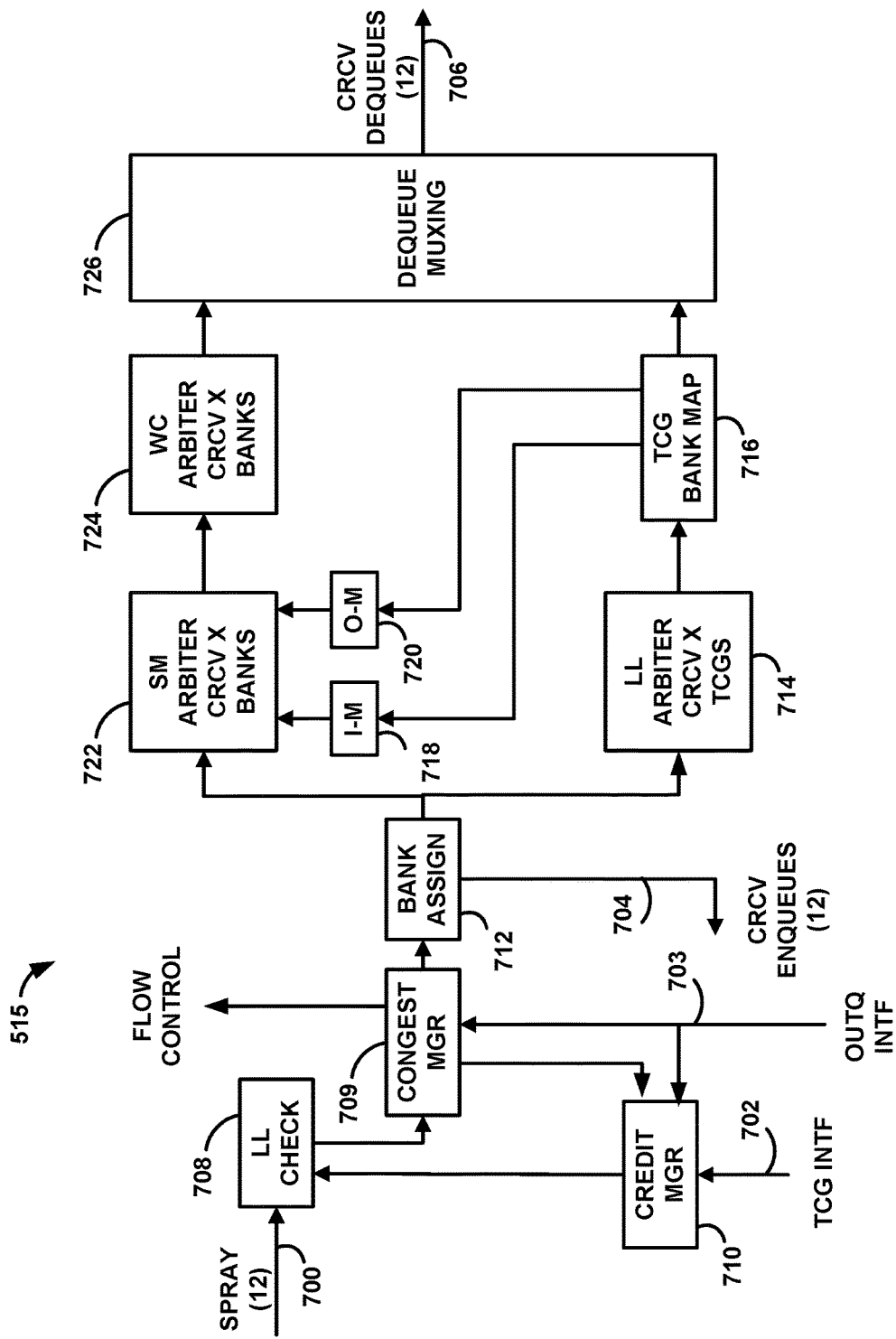
FIG. 8 is a block diagram illustrating a shared memory scheduler for use with the shared memory crossbar switches of FIGS. 6 and 7 according to techniques of this disclosure.

An example shared memory scheduler module 515 is shown in FIG. 8. In the example shown in FIG. 8, a spray interface 700 connected to spray lookup module 510 receives cell output information for each instance of cell to be transferred to shared memory crossbar switch 514. ATCG interface 702 received from each TCG 610 provides the credit information for output queue 620 free buffers. In the example shown in FIGS. 6-8, there is a separate TCG credit interface for each of the TCGs, for a total of twelve TCG credit interfaces. An OUTQ interface 703 connected to OUTQ 516 provides the credit information for sm (shared memory) free buffers. A CRCV enqueue interface 704 connected to each CRCV block 602 sends the command from sm_sch module 515 to each CRCV block 602 for bank conflict FIFO enqueue and, in some cases, a low latency bit to indicate the low latency path selection. In some such example approaches, bank conflict FIFOs are small fifos which store the cells for resolving the bank-write operation. A CRCV dequeue interface 706 sends the dequeue command from sm_sch module 515 to CRCV block 602 for writing the cell in shared memory space for either the low latency data path or the shared memory datapath.

In one example approach, such as is illustrated in FIG. 8, shared memory scheduler module 515 includes a low latency check module 708, a congestion manager 709, a credit management module 710, a bank assign module 712, a low latency arbiter module 714, a TCG bank map module 716, input masking logic 718, output masking logic 720, shared memory arbiter module 722, work conserving arbiter module 724, and dequeue muxing logic 726.

In one example approach, low latency check (ll-chk) module 708 decides on the enqueue of the cell for TCG and SM queues based on information received from credit management module 710 on their free buffer space, respectively. In one example approach a TCG queue 620 in each TCG 610 buffers cells to be transferred to output ports 404, while SM queues in CRCV blocks 602 store cells to be transferred to shared memory crossbar switch 514. In one example approach, cells in CRCV blocks 602 are split between low latency path queue 616 and shared memory write queue 618 (for low latency capable cells and shared memory write cells, respectively).

To support dynamic decision, if there are no cells in SM space for a corresponding SM queue and the corresponding TCG 610 has free space, the cells are sent to the TCG 610 (output) using the low-latency path through bypass mechanism 612. This condition can happen at the start of traffic, in non-congested flows or during random traffic patterns. Such dynamic switching provides the low latency and smooth traffic flow from input to output ports during all kinds of traffic patterns. In one example approach, sm_sch module 515 maintains two sets of SM queues (such as low latency path queue 616 and a shared memory write queue 618 shown in FIG. 7). One set of SM queues is used to store low latency capable cells, while the second set of queues is used to store cells for shared memory writes.

Congestion management keeps account of SM (shared memory) space availability. In the example approach of FIG. 8, congestion manager 709 manages the SM resources, deciding the flow control generation, and enqueue or drop decisions for the incoming cells within CRCV blocks 602. When sm space utilization goes above the configured threshold (in a congestion traffic scenario), congestion manager 709 may enable dropping of cells received at CRCV blocks 602.

In some example approaches, to support the robustness of design (or if flow control is not honored), another threshold is supported to drop the incoming cells based on the sm occupancies. In some example approaches, low latency does not consume the sm space, but only uses a few locations to pass through. In such approaches, space is reserved for low latency traffic. So, traffic control via congestion manager 709 acts only upon the non-low latency traffic.

In one example approach, the drop cells are also sent to crcv blocks 602 through the crcv enqueue path to drop the actual cell (crcv block 602 only sends the cell command and stores the complete cell in its local buffer). When a cell is dropped, no bank assignment happens.

In one approach, congestion manager 709 also provides the sm empty state to credit manager block 710, which in turns uses the sm empty state for low latency checking.

In one example approach, a congestion manager 709 determines, based on low latency path check 708, credit manager 710 and queuing information from OUTQ 516, whether flow control is needed. In one such example approach, a decision to implement flow control or to drop cells is made when shared memory gets too full for a particular cell group, or for a particular CRCV block 602. Flow control is discussed further in the context of FIG. 9 below. In some example approaches, flow control techniques do not apply to transfers on the low latency path. Congestion manager 709 also operates with credit manager 710 to increment and decrement counters in credit manager 710.

In one example approach, for Low Latency Transfers, sm_sch module 515 decrements a port credit in credit manager 510 when a Low Latency is accepted. The decrement happens as soon as the decision for Low Latency transfer is made. In another example approach, for Shared Memory Transfers, credit is decremented when a cell is transferred from SM to TCG. Outq information is used to decrement the sm resources and tcg credits. Credit is incremented when a tcg releases the credit on the tcg interface.

Credit relative to the TCG buffers are managed using credits in OUTQ (for transferring shared memory cell reads) and SM_SCH (for transferring Low Latency cells). The buffers are the same but the credits are managed independently depending on Low Latency or Shared Memory transfers. In one example approach, outq 516 keeps per TCG per bank based 2 credits, whereas, sm_sch keeps total of 48 credits per tcg without the notion of banks.

Credit within OUTQ 516 is handled in the following manner. For Low Latency Transfers, OUTQ 516 decrements the port credit for a bank. In some example approaches, this is done by logical, not physical, shared memory bank number (LSMB number). The decrement happens when CRCV sends the enqueue bypass command for Low Latency transfer. For Shared Memory Transfers, when a cell is dequeued, OUTQ 516 decrements the port/queue credit for the bank which equals to PSMB number and sends out the sm read command. Credit is incremented when tcg 610 releases the credit on the interface.

In one example approach, shared memory bank numbers are assigned to incoming cells received from the spray interface 700 using bank assign module 712. In one such example approach, shared memory bank numbers are assigned in round-robin manner for each output port 404. This bank ordering is assumed by each TCG 610 to remain aligned and to resolve the reorder on the cell transfer because of multiple banks. In one example approach, bank assign module 712 assigns a sequence number as a function of shared memory bank to each cell after making the bank assignment.

In the example illustrated in FIG. 8, the arbitration to match queues in CRCV blocks 602 to output banks is done in low latency arbiter module 714, shared memory arbiter module 722 and work conserving arbiter module 724. In one such example approach, both low latency arbiter module 714 and shared memory arbiter module 722 use a Hamiltonian and limited-iSLIP (HL-ISLIP) version of the iSLIP algorithm while work conserving module 724 uses the iSLIP algorithm. A limited-iSLIP algorithm is one in which, once a connection is made, that connection is not changed until the input queue is empty or a programmable number of cycles has occurred. The programmable number acts as an upper bound on the number of cells that can be transmitted before changing the connection match.

For better performance, a Hamiltonian Walk along with limited-iSLIP can be used (HL-iSLIP). A Hamiltonian Walk is a walk which visits each vertex of a graph exactly once. In an N×N switch, the total number of possible schedules is N!. In a permutation using combinational logic, the next state is different than the current state only on two edges, which is implementation friendly.

In one example approach, Limited-iSLIP and Hamiltonian walk work in parallel. Every cycle each of them produces a matching vector. The vector which has the highest total queue depths is chosen as the final match for that cycle. Once a match with the highest weight (queue depth) is chosen, then that is used as the starting match for limited-iSLIP to produce the next limited-iSLIP match. Hamiltonian walk continues from the previous Hamilton match to get the next Hamilton matching vector.

In one example approach, low latency arbiter module 714 is for low latency path cell transfers, which arbitrate for crcv (input ports)×tcg (output port). In one such example approach, on an identified crcv-tcg path, the low latency connection may use a physical bank 606 in shared memory space as described above to transfer the cell using similar physical resources. In such an approach, the physical bank number may be assigned by TCG bank map module 716, which, in some example approaches, maintains an outq (tcg-bank) scheduler (a simple round robin/tdm scheduling) that runs N cycles in advance. By knowing the tcg-bank connection in advance, sm_sch module 164 may assign the physical bank number to this connection. In one such approach, an Outq scheduler sends low latency traffic on this particular connection when it actually happens in OUTQ module 516.

As noted above, in one example approach, the scheduler at the input in sm_sch module 515 attempts to obtain maximal matching for transfers from input to shared memory 605 in the following priority order. First, the scheduler does the maximal matching to choose the low latency transfers from input-output buffers. If a match happens then it assigns the bank 606 through which the transfer is going to happen (in some example approaches, this may be done using a TDM table). Second, all the input buffers and banks that are used for low latency transfers are disabled for shared memory writes. The scheduler then does the maximal matching for the input buffers to shared memory banks as noted above. Finally, the scheduler does work conserving arbitration to assign any of the remaining input buffers to shared memory banks.

In one example approach, input masking logic 718 and output masking logic 720 may be used to maintain input and output port uniqueness across arbiters 714, 722 and 724. In cooperation with dequeue muxing logic 726, input masking logic 718 and output masking logic 720 operate to ensure that there is only one send connection per CRCV block 602. These masks ensure that each arbiter's input/output gets the relevant enables only.

In one example approach, shared memory arbiter module 722 arbitrates for the crcv×shared memory bank traffic. In one such approach, arbiter module 722 maintains internal state irrespective of the mask but the connection can't progress if the mask for a crcv or bank is asserted. Prioritizing the low latency path connection of low latency arbiter module 714 over an existing SM arbiter module's suggested connection can produce a hole in the performance. For example a crcv-"a" connected with bank-"c" from an SM-arbitration perspective is not used if the low latency path used bank-"c", leaving crcv-"a" not used in the current cycle.

To fill these performance gaps, work conserving (WC) arbiter module 724 is used. In one example approach, WC arbiter module 724 doesn't need to use a full HL-iSLIP approach, as the functionality of WC arbiter module 724 is to try to find the connection for unused/dropped CRCVs and shared memory banks because of overlapping of arbiter modules 714 and 722. Instead, in some such example approaches, WC arbiter module 724 uses the iSLIP algorithm.

These arbiters provide a unique connection from input to output ports. In HL-iSLIP the arbiters (arbiter modules 714 and 722) retain the state/connection for multiple transfers whereas in iSLIP, WC arbiter module 724 creates based on last state and new request.

Operation in low latency and shared memory modes will be described next.

In one example, a cell is transmitted over multiple cycles to Cell Receive (CRCV) Block 602. Cell Receive block 602 is capable of handling multiple contexts; when the header bits are available CRCV block 602 transfers the associated cell to spray lookup module 510 for looking up the destination output port. In one such example, there are three identical paths, one for request, one for grant and one for data transfers. In some such examples, the data data-path contains a header and also a payload; the request and grant data-paths only contain a header.

In one example approach, more than one header (from input ports 402) may be available in one cycle in a given cell receive group. In one such approach, core 500 executes a round robin operation to make sure only one header from each cell receive block 602 can be transferred to spray lookup module 510 each cycle.

In one example approach, the body of each cell is written to one of the SM buffers in CRCV 602. The writes to the write buffers can have collisions going to one bank which, in some example approaches, are resolved using shallow FIFOs.

In one example approach, spray lookup module 510 does the destination output port look up and sends, via spray port 512, the output port number for the cell along with, in some example approaches, a bit to indicate whether the cell is Low Latency Capable. In some such approaches, a Low Latency Capable bit is used to indicate that the cell is low latency capable; in some such approaches, the bit indicates whether cells directed to that destination output port can be sent through the low latency path to the destination output port. In other example approaches, the low latency path determination, based on both destination output port and output buffer capacity, is performed in sm_sch module 515.

In one example approach, congestion manager 709 performs the cell accounting operation first to check whether the cell can be admitted to CRCV block 602. In one such approach, this is done using counters maintained in CRCV block 602. If a cell is eligible to be admitted then sm_sch module 515 performs a shared memory bank spray computation to determine a logical shared memory bank (LSMB) and a bank sequence number is also assigned so that the order of arrival of cells is maintained across the receive cell groups.

In one example sm_sch module 515 approach, if the cell arriving from spray lookup module 510 is determined to be targeted to a destination output port that is Low Latency Capable and Shared Memory Queue is empty, then dynamic TCG cell credits are used to determine if the cell can be sent through a Low Latency Path. Otherwise, the cell is sent through the shared memory path.

In one example approach, a programmable threshold in sm_sch module 515 is used to limit the number of cells that can be sent through low latency path before switching to shared memory path.

Figure 9:
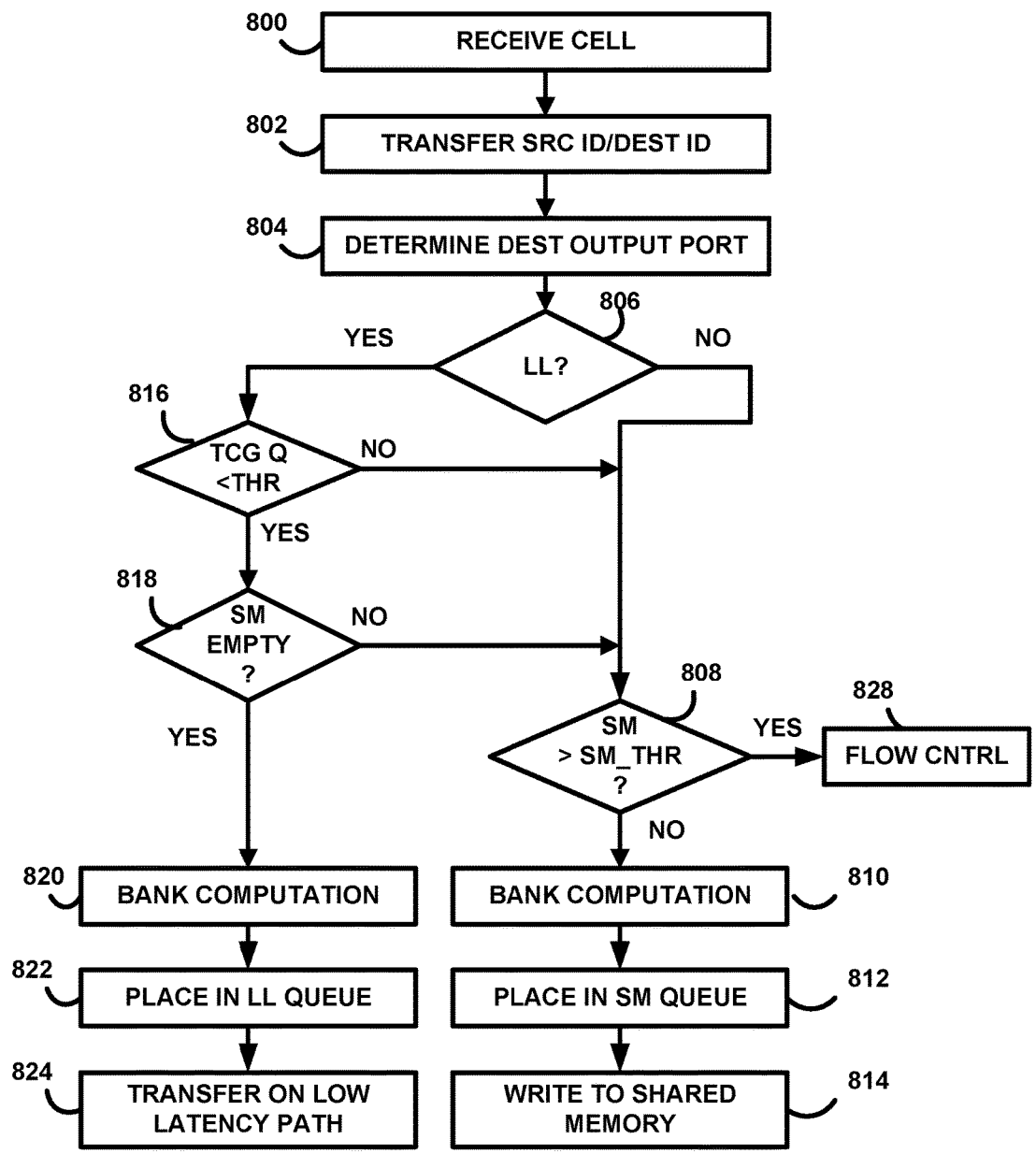
FIG. 9 is a flow chart illustrating transfer of a cell through a shared memory crossbar switch according to techniques of this disclosure.

FIG. 9 is a flow chart illustrating transfer of a cell through a shared memory crossbar switch according to techniques of this disclosure. A CRCV block 602 receives a cell. (800) CRCV block 602 transfers the source ID and destination ID to an associated spray lookup module 510. (802) Spray lookup module 510 determines the destination output port and transfers the output port to sm_sch module 515. (804) Sm_sch module 515 receives the destination output port and determines if the cell is low latency path eligible. (806) If the cell is not low latency path eligible, a check is made to determine if the shared memory is too full (SM>SM_thr). (808) If the shared memory is too full, congestion manager 709 is invoked, and a decision is made to drop the cell, or to implement flow control over the cell stream. (828) If the shared memory is not too full at (808), a bank computation is performed by bank assign module 712 (810) and the cell is written to a shared memory write queue 618 in the CRCV block 602 that received the cell (812). The cell is then written to shared memory 605 at the shared memory bank 606 selected by bank assign module 712. (814) In one example approach, the bank is assigned as a logical shared memory bank (LSMB) number.

If the cell is low latency path eligible, a check is made to determine if the output port that is the cell's destination has enough space in its output buffer (i.e., there are less than a programmable number of cells in the output buffer). (816) If not, a check is made to determine if the shared memory is too full (SM>SM_thr). (808) If the shared memory is too full, congestion manager 709 is invoked, and a decision is made to drop the cell, or implement flow control over the cell stream. (828). If the shared memory is not too full at (808), the cell is written to shared memory 605 (824) at a shared memory bank 606 selected by bank assign module 712. (826)

If the output port that is the cell's destination has enough space in its output buffer (i.e., there are less than a programmable number of cells in the output buffer), a check is made to determine if there are any cells in shared memory 605 for that output buffer. (816) If so, a check is made to determine if the shared memory is too full (SM>SM_thr). (818) If the shared memory is too full, congestion manager 709 is invoked, and a decision is made to drop the cell, or implement flow control over the cell stream. (828). If the shared memory is not too full, a bank computation is performed by bank assign module 712 (810) and the cell is written to a shared memory write queue in the CRCV block 602 that received the cell (812). The cell is then written to shared memory 605 at the shared memory bank 606 selected by bank assign module 712 as noted above. (814)

If, however, there are not any cells in shared memory 605 for that output buffer at (818), the cell will use the low latency path associated with the output port that is the cell's destination. A bank computation is performed by bank assign module 712 based on the destination output port received from spray lookup module 510 (820) and CRCV block 602 places the cell in a low latency path queue 616. (822) The cell is then transferred to its destination output port on the low latency path. (824)

An example low latency path will be discussed next.

In one example, CRCV block 602 queues each cell to a cell transmit group (in the example shown, there are 12 cell transmit groups on the transmit side). Inside the Cell transmit group the LSMB is maintained. In one such example, sm_sch module 515 decrements a TCG cell credit count and low latency arbiter module 714 picks 0-12 cells per cycle for Low Latency Transfer (from the 12 input cell receive FIFOs). Arbiter 714 also assigns a physical shared memory bank (PSMB) number through which the cell will be transferred. In one such example, PSMB is the bank that will be used for the cell transmit group for transfer in OUTQ 516. CRCV block 602 then sends the LSMB number along with the output queue on a PSMB interface while sending the cell header and payload on the interface to shared memory 514.

In one such example, OUTQ 516 decrements the TCG credit using LSMB, bypasses the enqueue and dequeue operations and inserts a bubble for the read request to PSMB. Shared Memory bank 606 then bypasses the write data to read side interface using the bubble inserted for the read and TCG 610 writes the data to LSMB (not PSMB).

An example shared memory path will be discussed next.

In one example approach, the number of banks in shared memory 605 is twice the number of Input/Output Buffers as shared memory 605 is implemented with single ported memory. In one such example approach, there is an any-to-any crossbar from the input to shared memory and, similarly, from shared memory to Output (as shown, for example, in FIG. 7).

In one example shared memory write approach, CRCV block 602 queues the cell to the LSMB (which will also be the same PSMB through which the cell will be transferred, i.e., LSMB==PSMB). Arbiter modules 722 or 724 cooperate to select 0-12 cells per cycle for Shared Memory Transfer (from 12 input cell receive FIFOs). In one such example, only 1-12 cells of both Low Latency and Shared memory can be transferred per cycle. CRCV block 602 send the transfers to both OUTQ 516 and shared memory 605 using the cell address. Shared memory 605 then writes the cell at the cell address location.

As multiple ports from different CRCV blocks 602 may be sending traffic to the same output queue, there is the possibility that later arriving cells from one CRCV block 602 may be scheduled for transfer earlier than the longer waiting cell from another CRCV block 602, because of the traffic pattern. In one example approach, OUTQ 516 performs a reorder operation to send the cells based on incoming order. In one example approach, OUTQ 516 maintains a reorder buffer pointer per shared memory bank 606; the reorder operation is performed by assigning a sequence number to each cell as a function of shared memory bank after bank assignment. In one such example approach, bank assign module 712 assigns the sequence number after making the bank assignment. The enqueue of the cell is done only when the cell's sequence number matches the head bank sequence number in the reorder buffer pointer associated with that shared memory bank (i.e., OUTQ 516 performs the reorder operation on a per bank basis based on the sequence number). OUTQ 516 will schedule a read for a cell from a bank only when its expected sequence number matches with the available sequence number. If later sequence numbers are available but not the current one, OUTQ 516 waits for the expected sequence number. In one example approach, a sequence number is assigned to all enqueuing traffic, including low latency path traffic (drop traffic will not have bank number and sequence number).

For low latency traffic, in one example approach, OUTQ 516 disables the sequence number check. That is, a low latency path cell does not wait to form the correct order. But the sequence number is still managed for both consistency and for managing the mix of traffic.

In one example approach, OUTQ 516 dequeues the cell, passes the address to shared memory 605 and decrements the port credit. OUTQ sends the dequeue information back along with the input/output port number to sm_sch module 515 2 for accounting purposes.

In one example approach, when low latency traffic needs to be sent to an output queue 620 from any of the low latency path queues 616, the existing shared memory crossbar 514 is overloaded to achieve this switching.

In one example approach, core 500 maintains a queue per bank at the input buffers and a queue per output buffer. In one such example approach, each output buffer maintains a queue 620 for each sub-channel as storage for cells. In one such example approach, the cells for a given stream (sub-channel) are sprayed across all the banks 606 of shared memory 605 so that the reads will not have any conflicts. A given output queue 620 gets access to one bank/cycle for transfer of read data; this is a static partition of the bank bandwidth to each output queue 620. This static partitioning of bank bandwidth to each output buffer is achieved, in various example approaches, using either round robin arbitration or a TDM table.

In one example approach, if shared memory 514 is empty for a particular sub-channel and the number of entries in output queue 620 for that sub-channel are below a threshold, then low latency transfer is enabled. Once the number of entries in the output queue are over the threshold, low latency transfer is disabled and the transfers again happen through shared memory 514. The transfers can again move out of shared memory 514 once the shared memory queue for that sub-channel is empty and the number of entries in the output buffer is below a predefined threshold. A stream of packets can move dynamically from low latency to shared memory and back to low latency depending on the traffic pattern.

A unified TCG path will be discussed next.

In one example, TCG 610 has interfaces with separate Request, Grant and Data data-paths. These fields are merged and form a cell to send out to output interface 504. In one such example, when TCG 610 reads a cell out of its buffers, it sends a port/queue LSMB credit to OUTQ 516 and a port credit to CRCV block 602.

In one example, a scheduler at the input tries to obtain maximal matching for transfers from input to shared memory by maintaining a priority order. First, the scheduler does maximal matching to choose low latency transfers from input-output buffers. If a match happens then it assigns the bank through which the transfer is going to happen (this will be done using, for example, a TDM table). Second, all input buffers and banks that are used for low latency transfers are disabled for shared memory writes; the scheduler then does the maximal matching for the input buffers to shared memory banks. In one example approach, this maximal matching happens independent of the low latency matching, but the outputs selected for low latency transfers do not progress in the connection. That is, the connection is accepted and retained but won't progress until a later cycle as noted above. Finally, the scheduler works to conserve arbitration in assigning any of the remaining input buffers to shared memory banks.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transient, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Various examples have been described. These and other examples are within the scope of the following claims.

What is claimed is:

1. A method of transferring cells through a switch fabric having a shared memory crossbar switch, a plurality of cell receive blocks and a plurality of cell transmit blocks, wherein the shared memory crossbar switch includes a shared memory having a plurality of shared memory banks, wherein each shared memory includes a low latency path, the method comprising:

identifying, based on a number of cells enqueued in respective output buffers in the cell transmit blocks, output buffers in the cell transmit blocks that can receive cells on one of the low latency paths;

identifying, as low latency capable cells, cells to be routed to the output buffers in the cell transmit blocks that can receive cells on the low latency path;

transferring cells from the cell receive blocks to the output buffers in the cell transmit blocks, wherein transferring the cells includes:

selecting a shared memory bank for each low latency capable cell to be transferred;

selecting a shared memory bank for each cell to be transferred that is not a low latency capable cell;

transferring each low latency capable cell to its respective output buffer, wherein transferring includes passing the low latency capable cell through the low latency path in the shared memory selected for the respective low latency capable cell;

storing the cells that are not low latency capable in the shared memory bank selected for the cell; and transferring the cells stored in the shared memory banks to specified output buffers in the cell transmit blocks.

2. The method of claim 1, wherein the low latency path includes a bypass mechanism in shared memory that directs a cell received at a shared memory bank to an output of the shared memory bank instead of storing the cell in the shared memory bank.

3. The method of claim 1, wherein the low latency path includes a bypass mechanism in shared memory that stores the low latency capable cell to shared memory and writes a read address corresponding to the cell's location in shared memory to the output buffer designated to receive the respective low latency cell.

4. The method of claim 1, wherein the low latency path includes a bypass mechanism in shared memory that stores the low latency capable cell to a location in the selected shared memory bank and that writes a read address corresponding to the location in the selected shared memory bank used by the output buffer designated to receive the respective low latency cell to read the low latency capable cell from the shared memory bank.

5. The method of claim 1, wherein identifying output buffers that can receive cells on one of the low latency paths includes maintaining a count, in a shared memory scheduler, of cells stored in each output buffer and designating an output buffer as low latency capable when the output buffer count is less than a predefined threshold.

6. The method of claim 1, wherein identifying output buffers that can receive cells on one of the low latency paths includes maintaining a count, in a shared memory scheduler, of cells stored in each output buffer and designating an output buffer as low latency capable when the output buffer count is less than a predefined threshold and there are no cells in a shared memory write queue associated with that output buffer.

7. The method of claim 1, wherein identifying output buffers that can receive cells on one of the low latency paths includes determining output port numbers of output ports usable for reaching particular destination fabric endpoints and determining if the output ports associated with those output port numbers are capable of receiving a cell via the low latency path.

8. The method of claim 7, wherein determining if the output ports associated with those output port numbers capable of receiving a cell via the low latency path includes accessing a lookup table organized by output port number to determine if the corresponding output port is low latency capable.

9. The method of claim 7, wherein determining if the output ports associated with those output port numbers capable of receiving a cell via the low latency path includes accessing a lookup table organized by output port number to determine if the corresponding output port is low latency capable and determining if the number of cells in output buffers associated with the corresponding output port are below a threshold number of cells.

10. The method of claim 1, wherein identifying output buffers that can receive cells on one of the low latency paths includes determining, based on each cell's input and output port information, output port numbers of output ports that can be used to reach particular destination fabric endpoints and determining if the output ports associated with those output port numbers are capable of receiving a cell via the low latency path.

11. The method of claim 1, wherein transferring further includes, for those cells that can be transferred via the low latency path, queueing cells in a low latency path queue in the cell receive blocks and, for those cells that are not low latency capable, queueing cells in a shared memory write queue in the cell receive blocks.

12. The method of claim 1, wherein transferring further includes performing flow control, based on shared memory space availability, for cells that are not low latency capable.

13. A router, comprising:
a plurality N of cell transmit blocks, wherein each cell transmit block includes one or more output buffers;
a plurality N of cell receive blocks, wherein each cell receive block stores cells received from a fabric endpoint in a cell receive block output queue, wherein each cell includes a payload and a destination identifier, and wherein each destination identifier is associated with a different cell transmit block;
an N×3N bank write crossbar switch connected to the cell receive block output queues;
a 3N×N bank read crossbar switch connected to the output buffers in the cell transmit blocks;
a shared memory connected to the bank write crossbar switch and to the bank read crossbar switch, wherein the shared memory includes M banks, wherein each shared memory bank includes a shared memory bypass mechanism; and
a scheduler, wherein the scheduler identifies low latency capable cells enqueued in the cell receive blocks, selects a shared memory bank for each identified low latency capable cell, and routes each identified low latency capable cell via the shared memory bypass mechanism of the shared memory bank selected for the low latency cell to an output buffer of the cell transmit block specified by the destination identifier of the low latency cell, and
wherein the scheduler selects a shared memory bank for each cell that is not low latency capable and routes each such cell to memory of the selected shared memory bank.

14. The router of claim 13, wherein each shared memory bank is a single-ported memory bank, and wherein M=3N.

15. The router of claim 13, wherein each shared memory bank is a dual-ported memory bank, and wherein M=N.

16. The router of claim 13, wherein the one or more queues in each cell receive block include N low latency path write queues and M shared memory write queues, wherein each low latency path write queue is associated with a different cell transmit block and wherein each shared memory write queue is associated with a different shared memory bank.

17. The router of claim 16, wherein the scheduler selects cells to enqueue into each shared memory write queue and cells to enqueue into each low latency path write queue.

18. The router of claim 13, wherein each cell receive block includes a spray lookup function, wherein the spray lookup function determines output port information as a function of a cell's source and destination information.

19. The router of claim 13, wherein the scheduler receives output port information from a spray lookup function associated with each cell receive block and selects a cell to be transmitted for each cell receive block.

20. The router of claim 13, wherein the scheduler receives output port information from a spray lookup function associated with each cell receive block, determines cells that can be transferred via the bypass mechanism via a low latency arbiter module and selects a cell to be transmitted from each cell receive block.

21. The router of claim 13, wherein each cell transmit block includes an output buffer for each sub-channel.

22. The router of claim 13, wherein the shared memory bypass mechanism ensures that a write to a shared memory bank is followed by a read using the write address.

23. The router of claim 13, wherein the shared memory bypass mechanism directs a cell received at a shared memory bank to an output of the shared memory bank instead of storing the cell in the shared memory bank.

24. A router, comprising:
a plurality of ingress ports;
a plurality of egress ports;
a switch fabric having a plurality of fabric endpoints connected to the ingress ports and the egress ports, wherein the switch fabric includes one or more fabric planes, wherein each fabric plane includes one or more shared memory crossbar switches, wherein each shared memory crossbar switch includes:
a plurality N of cell transmit blocks, wherein each cell transmit block is connected to a different egress port and includes one or more output buffers;
a plurality N of cell receive blocks, wherein each cell receive block is connected to a different ingress port and includes one or more queues, wherein each cell receive block stores cells received from its respective ingress port in one of the one or more cell receive block queues, wherein each cell includes a payload and a destination identifier, and wherein each destination identifier is associated with a different cell transmit block;
an N×3N bank write crossbar switch connected to the cell receive block queues;
a 3N×N bank read crossbar switch connected to the output buffers in the cell transmit blocks;
a shared memory connected to the bank write crossbar switch and to the bank read crossbar switch, wherein the shared memory includes M banks, wherein each shared memory bank includes a shared memory bypass mechanism; and
a scheduler, wherein the scheduler identifies low latency capable cells enqueued in the cell receive blocks, selects a shared memory bank for each identified low latency capable cell, and routes each identified low latency capable cell via the shared memory bypass mechanism of the shared memory bank selected for the low latency cell to an output buffer of the cell transmit block specified by the destination identifier of the low latency cell, and
wherein the scheduler selects a shared memory bank for each cell that is not low latency capable and routes each such cell to memory of the selected shared memory bank.

25. The router of claim 24, wherein the one or more queues in each cell receive block include N low latency path write queues and M shared memory write queues, wherein each low latency path write queue is associated with a different cell transmit block and wherein each shared memory write queue is associated with a different shared memory bank.

26. The router of claim 24, wherein the switch fabric is arranged as a multi-stage switch fabric, wherein each stage includes one or more shared memory crossbar switches, wherein each shared memory crossbar switch includes a plurality of shared memory banks, wherein each shared memory bank includes a bypass mechanism used to transfer a cell received from one of the low latency path queues on a low latency path through the shared memory bank to one of the cell transmit block output buffers.

27. The router of claim 24, wherein each cell transmit block includes an output buffer for each sub-channel.

* * * * *